United States Patent [19]
Heitz et al.

[11] Patent Number: 4,605,732
[45] Date of Patent: Aug. 12, 1986

[54] PROCESS FOR THE PRODUCTION OF POLYARYLENE SULPHIDES WITH FUNCTIONAL END GROUPS

[75] Inventors: Walter Heitz, Kirchhain; Wolfgang Koch, Mittenaar, both of Fed. Rep. of Germany

[73] Assignee: Bayer Aktiengesellschaft, Leverkusen, Fed. Rep. of Germany

[21] Appl. No.: 739,204

[22] Filed: May 30, 1985

[30] Foreign Application Priority Data
Jun. 9, 1984 [DE] Fed. Rep. of Germany ....... 3421608

[51] Int. Cl.$^4$ ............................................. C08G 75/14
[52] U.S. Cl. ..................................... 528/388; 525/537
[58] Field of Search ......................... 528/388; 525/537

[56] References Cited
U.S. PATENT DOCUMENTS
4,535,149 8/1985 Ebert et al. .......................... 528/388
4,537,951 8/1985 Idel et al. ............................. 528/388

Primary Examiner—Melvyn I. Marquis
Attorney, Agent, or Firm—Connolly and Hutz

[57] ABSTRACT

The invention relates to a process for the production of polyarylene sulphides with functional end groups.

1 Claim, No Drawings

PROCESS FOR THE PRODUCTION OF POLYARYLENE SULPHIDES WITH FUNCTIONAL END GROUPS

The invention relates to a process for the production of polyarylene sulphides with functional end groups.

Polyarylene sulphides and the production thereof are known, for example, from U.S. Pat. Nos. 25,13,188, 31,17,620, DE-AS No. 24 53 485, DE-OS No. 26 34 462. It is also known that, in the production of polyarylene sulphides, the process can be carried out in such a way that the polymers produced contain groups still capable of further reaction (for example, FR-PS No. 2 470 780).

It has accordingly been found that polyarylene sulphides with further reactive end groups capable of reacting are obtained if disulphides and optionally further oxidizing agents and compounds which are monofunctional under the reaction conditions are added to the reaction mixture during production.

The object of the invention is thus a process for the production of polyarylene sulphides with functional end groups from (a) from 50 to 100 mol % of dihalogen aromatic substances corresponding to the formula

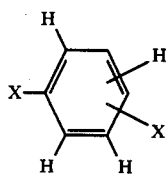

(I).

and from 0 to 50 mol % of dihalogen aromatic substances corresponding to the formula

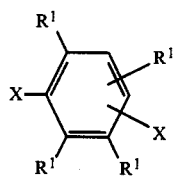

(II)

in which

X represents halogen such as chlorine or bromine in the meta or para position relative to each other, and
$R^1$ which may be the same or different represents hydrogen, $C_1$-$C_4$-alkyl, $C_5$-$C_{10}$-cycloalkyl, $C_6$-$C_{10}$-aryl, $C_7$-$C_{14}$-alkylaryl, $C_7$-$C_{14}$-arylalkyl, wherein two radicals $R^1$ in the ortho position relative to each other can be bound to an aromatic or heterocyclic ring containing up to 10 ring atoms, wherein up to 3 ring C-atoms can be replaced by heteroatoms such as O, N, S, and one radical $R^1$ is always different from hydrogen, and (b) alkali sulphides, preferably sodium sulphide or potassium sulphide or a mixture thereof, preferably in the form of their hydrates or aqueous mixtures, optionally together with alkali hydroxides such as sodium hydroxide and potassium hydroxide, the molar ratio of a:b lying in the range of 1:1 to 1:2, preferably from 1:1 to 1:1.5, (c) organic solvents, preferably N-alkyl lactams or peralkylated ureas, optionally with the coincidental use of catalysts and/or cosolvents, the molar ratio of alkali sulphides (b) to the organic solvent (c) lying in the range of from 1:2 to 1:20, and (d) water in the form of water of hydration or free water the molar ratio of b:d lying in the range of from 1:0 to 1:9, preferably 1:3 to 1:5 and the process being carried out at a reaction temperature of from 140° to 280° C., optionally under excess pressure, characterised in that the reaction is carried out in the presence of a dihalogenated disulphide corresponding to formula (III)

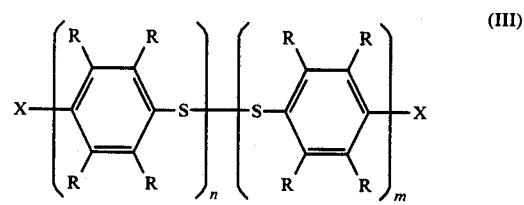

in which

X represents halogen, such as chlorine and bromine,
R represents hydrogen, a $C_1$-$C_4$-alkyl radical, a $C_5$-$C_{10}$-cycloalkyl radical, a $C_7$-$C_{14}$-aryl radical and the total number of carbon atoms in each aromatic substance is from 6 to 30, with the proviso that R is hydrogen in at least 50 mol % of the disulphide used, and n,m are integers of from 1 to 5, preferably from 1 to 3, with the proviso that the molar ratio of the disulphide to the dihalogen benzene corresponding to formulae (I) and (II) lies in the range of from 0.01:1 to 1.0:1 and a compound which is monofunctional under the reaction conditions and optionally an oxidizing agent is added to the reaction mixture.

Examples of dihalogen aromatic substances corresponding to formula (I) which can be used according to the invention are: m-dichlorobenzene, p-dichlorobenzene, p-dibromobenzene, m-dibromobenzene and 1-chloro-4-bromobenzene. They can be used alone or in mixtures with each other.

Examples of diahlogen aromatic substances corresponding to formula (II) which can be used according to the invention are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene. They can be used alone or in mixtures with each other.

With the addition of the polyhalogen compounds, from 1 to 50 mol %, preferably from 1 to 25 mol % of further bases, for example, alkalihydroxides, such as NaOH or KOH or from 0.5 to 25 mol %, preferably from 0.5 to 12.5 mol % of carbonates such as $Na_2CO_3$, based on alkali sulphide used can optionally be added.

Examples of aromatic disulphides corresponding to formula (III) which can be used according to the invention are: 4,4'-dibromodiphenyldisulphide, 4,4'-dichlorodiphenyldisulphide, bis-(4-bromo-3-methylphenyl)-disulphide, bis-(4-(4-bromo-phenyl(thio)-phenyl)-disulphide. They can be used alone or in mixtures.

Monofunctional compounds corresponding to formula (IV)

$$X-R^1-Y \qquad (IV)$$

wherein

X represents chlorine, bromine or a vinyl group,

Y represents hydrogen, $-O-CH=CH_2$, $-S-CH=CH_2$, $-OH$, $-OR^2$, $-SR^2$, $-NR^2$, $-NO_2$, $-CN$, $-COOR^2$, CHO, $R^1$ represents an alkyl radical or a cycloalkyl radical with from 1 to 10 carbon atoms, an aryl radical with from 6 to 10 carbon atoms, with the proviso that two substituents Y can be positioned on the aryl radical, or an aryl radical corresponding to formula (V)

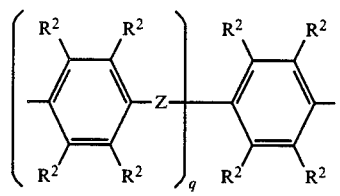 (V)

wherein,

Z represents $CH_2$, $C(CH_3)_2$, sulphur or oxygen and each $R_2$ represents hydrogen, an aryl radical, a cycloalkyl radical, an aryl radical or a mixture thereof, and with the proviso that the molar ratio of the dihalogen benzenes corresponding to formulae (I) and (II) to the functional compound lies in the range of from 1:0.05 to 1:2 are added to the reaction mixture under the reaction conditions.

For example, the following compounds corresponding to formula (IV) can be used: 1-bromodecane, isopropylbromide, tert.-butylbromide, 2-chloroethyl-vinylether, 2-bromoethanol, 2-bromoethyl-ethylether, chlorodimethylsulphide, 2-bromoethylamine, 2-diethylaminoethylchoride, 2-bromonitroethane, 2-chloroacetic acid, 4-chlorophenylvinyl-sulphide, 4-bromophenol, 2,6-dimethyl-4-bromophenol, 4-bromoanisole, 4-bromoaniline, 3-bromonitrobenzene, 4-chlorobenzonitrie, 4-chlorobenzaldehyde, 4-chlorobenzoic acid, 4-chlorophthalic acid, 4-chlorophthalic acid anhydride, 4-chloro-o-phenylene diamine, 4-bromotert.-butylbenzene, 4-chloro-4'-hydroxybenzophenone, 4-bromo-4'-hydroxybiphenyl, 4-bromo-4'-aminodiphenylsulphide, 4-bromo-4'-hydroxydiphenylether, (4-bromophenyl)-(4'-hydroxylphenyl)-methane.

The alkali sulphides, preferably potassium sulphide and sodium sulphide, are preferably used in the form of their hydrates or aqueous solutions. They can also be produced directly from hydrogen sulphide and the corresponding alkali hydroxides or from alkali hydrogen sulphides and corresponding alkali hydroxides according to a stoichiometric reaction in the reaction solution. Mixtures of the alkali sulphides can be used.

Depending on the proportion of alkali hydrogen sulphide in the reaction solution, which may be contained as impurity in the alkali sulphide or may be formed during the reaction, alkali hydroxide such as sodium hydroxide or potassium hydroxide is additionally metered in, in a stoichiometric quantity to regenerate the alkali sulphide. Compounds which split off or form alkali hydroxides under the reaction conditions can optionally be added instead of the alkali hydroxides.

Examples of oxidizing agents which can be used according to the invention are: sulphur (preferably elementary sulphur), halogens such as, iodine, bromine, chlorine, metal compounds such as manganese (IV) oxide, iron (II) chloride, copper (II) chloride.

They can be used alone or in a mixture with each other.

The oxidizing agent is added to the reaction mixture in an oxidation equivalent ratio of from 0.02:1 to 0.5:1, based on the dihalogen benzene.

If sulphur is used as the oxidizing agent, molar ratios of sulphur/dihalogen benzene of from 0.02:1 to 0.3:1 are preferably used.

The oxidizing agent and the disulphide can be added to the reaction mixture at the beginning of the reaction or after a period corresponding to 50 to 90% of the total reaction period selected.

Generally speaking, any polar solvent which ensures adequate solubility of the organic and inorganic reactants under the reaction conditions can be used for the reaction. Amides, lactams and ureas are preferably used and N-alkylated amides, lactams and cyclic ureas are particularly preferably used.

Lactams in the context of the invention include lactams of amino acids containing from 3 to 5 carbon atoms, which can optionally carry substituents on the carbon skeleton, which are inert under the reaction conditions, for example, alkyl radicals containing from 1 to 5 carbon atoms.

N-alkyl lactams in the context of the invention are defined as the lactams according to the invention, but carry in addition an alkyl radical containing from 1 to 6 carbon atoms on the nitrogen atom.

Ureas in the context of the invention are tetraalkylated ureas corresponding to formula (VI),

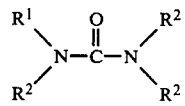 (VI)

in which $R^2$ which may be the same or different, represents a $C_1$- to $C_4$-alkyl radical as well as cyclic ureas corresponding to formula (VII),

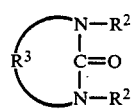 (VII)

in which $R^2$ has the meaning given above and preferably represents methyl and $R^3$ is an ethylene radical or propylene radical which may also be substituted.

N,N-dimethylformamide, N,N-diethylacetamide, N,N-di-propylacetamide, N,N-dimethylbenzoic acid amide, caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxohexamethylene imine, N-ethyl-2-oxohexamethylene imine, tetramethyl urea, 1,3-dimethylethylene urea, 1,3-dimethyl-propylene urea are mentioned by way of example.

Mixtures of the above-mentioned solvents may be selected.

The quantity of solvent can be selected within a wide range but is generally from 2 to 20 mol per mol of alkali sulphide.

The reaction temperature is generally from 140° to 280° C., preferably from 180° to 240° C.

The reaction can be carried out in two temperature ranges. For example, it is possible to maintain a temperature of from 140° to 260° C. after addition of the oxidizing agent and the disulphide and then to select a temperature range which is from 20° to 50° C. above the first temperature range once from 50 to 90% of the selected total reaction period have elapsed.

The pressure during the reaction can be from 1 to 20 bar.

The reaction time can amount to up to 10 hours, preferably from 0.2 to 8 hours. A step-wise increase in the reaction temperature during this period may be advantageous.

The dihalogen benzene and the alkali sulphide are reacted in approximately equimolar quantities. The molar ratio of dihalogen benzene to alkali sulphide lies in the range of from 1:1 to 1:1, preferably from 1:1 to 1:1.5.

The process according to the invention can be carried out as follows:

The alkali sulphides are placed in the solvent and then optionally in one or more stages, for example, by distilling the water from the solution the water content is reduced. A partial dehydration prior to addition of the dihalogen compounds may be advantageous.

In principle, the reactants can be combined in any manner. The dihalogen aromatic substances corresponding to formulae (I) and (II) and the disulphide corresponding to formula (III) may be added together or separately, continuously, in portions or directly in one go to the alkali sulphide and the solvent or to a portion thereof. However, the alkali sulphide can also be added together with the solvent or a portion thereof to the compounds corresponding to formulae (I) and (II) and to the disulphide corresponding to formula (III). It is also possible to combine all reactants directly. Any other combinations of the addition of reactants are also possible.

The addition of the oxidizing agent and the compound which is monofunctional under the reaction conditions corresponding to formula (IV) can also take place together or separately, in any sequence, all at once, in portions or continuously, optionally dissolved in the solvent used for the reaction.

After addition of the oxidizing agent and the compound corresponding to formula (IV), the reaction temperature is maintained for a further period of time. It is advantageous if this period of time is two to nine times as long as the period of time from the moment of addition of the oxidizing agent and of the compound corresponding to formula (IV) to the end of the reaction. On completion of the reaction, the polyarylene sulphide can be separated in the conventional way.

The polyarylene sulphide can be separated directly from the reaction solution or after addition, for example, of water and/or dilute acids, by conventional processes of filtration or of centrifuging. The separated polyarylene sulphides are subsequently washed, for example, with water.

Washing or extraction with other washing fluids which may be also carried out in addition or subsequently to this washing treatment is also possible.

The polymer can also be obtained by removing the solvent from the reaction chamber and by a subsequent washing treatment, as described above.

The polyarylene sulphides according to the invention can be further reacted via their functional end groups to form linear or cross-linked polymers and they can be coincidentally used for building up other plastics.

EXAMPLE 1

Production of poly(thio-1,4-phenylene) with n-decyl end groups.

3.68 g (25 mmol) of p-dichlorobenzene, 0.72 g (2.5 mmol) of 4,4'-dichlorodiphenyl disulphide, 3.63 g (27.5 mmol) of sodium sulphide trihydrate and 30 ml of N-methyl-2-pyrrolidone were combined in a 50 ml glass autoclave equipped with stirrer, manometer and metering device and were heated to 240° C. after purging with nitrogen.

After 1 hour, 1.11 g (5.0 mmol) of 1-bromodecane, dissolved in 5 ml of N-methyl-2-pyrrolidone was pumped in and the reaction mixture was maintained at 240° C. for a further hour. A maximum pressure of 6.2 bar arose. The cooled mixture was precipitated in 200 ml of 1n-sulphuric acid and subsequently washed with methanol.

After drying under vacuum (15 Torr) at 60° C., 2.93 g (79.7%) of product with a melting point of 275° C. were obtained.

EXAMPLE 2

Production of poly(thio-1,4-phenylene) with aldehyde end groups.

3.23 g (22 mmol) of p-dichlorobenzene, 1.58 g (5.5 mmol) of 4,4'-dichlorodiphenyl disulphide, 3.63 g (27.5 mmol) of sodium sulphide trihydrate, 2.04 g (11 mmol) of p-bromobenzaldehyde and 30 ml of N-methyl-2-pyrrolidone were combined in the apparatus described in Example 1, purged with nitrogen and heated to 240° C. for a period of 2 hours. The maximum pressure was 7.2 bar. After cooling to room temperature, the reaction mixture was worked up as described in Example 1.

3.11 g (75.2%) of a slightly yellow product with a melting point of 281° C. were obtained.

EXAMPLE 3

Production of poly(thio-1,4-phenylene) with hydroxy end groups.

3.68 g (25 mmol) of p-dichlorobenzene, 3.96 g (30 mmol) of sodium sulphide trihydrate, 0.43 g (5 mmol) of manganese dioxide and 30 ml of N-methyl-2-pyrrolidone were combined in the apparatus from Example 1 and heated to 200° C. with stirring, the pressure building up to 2.1 bar.

After 4 hours, 2.33 g (10 mmol) of 4-chloro-4'-hydroxybenzophenone were added and heated to 240° C. for a further 2 hours. The pressure rose to a maximum of 4.6 bar. After working up in the conventional manner, the yield was 3.13 g (67.0%).

EXAMPLE 4

Production of poly(thio-1,4-phenylene) with phthalic acid end groups.

2.94 g (20 mmol) of p-dichlorobenzene, 0.8 g (4 mmol) of 4-chlorophthalic acid, 64 mg (2 mmol) of sulphur, 2.64 g (20 mmol) of sodium sulphide trihydrate and 30 ml of N-methyl-2-pyrrolidone were combined in the apparatus from Example 1. The apparatus was purged with nitrogen and then heated to 200° C. for 2 hours and to 240° C. for 4 hours. The maximum pressure was 5.7 bar.

After working up in the manner described, 2.64 g (93.6%) of phthalic acid end group-containing poly(thio-1,4-phenylene) were obtained The product melted at 270° C.

We claim:

1. Process for the production of polyarylene sulphides with functional end groups wherein
   (a) from 50 to 100 mol % of dihalogen aromatic substances correspond to the formula (I)

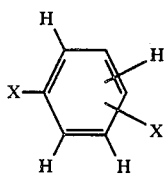

and from 0 to 50 mol % of dihalogen aromatic substances corresponding to the formula (II)

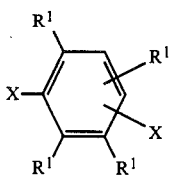

in which

X represents halogen in the meta or para position relative to each other, $R^1$ is the same or different and each represents hydrogen, $C_1$-$C_4$-alkyl, $C_5$-$C_{10}$-cycloalkyl, $C_6$-$C_{10}$-aryl, $C_7$-$C_{14}$-alkylaryl, $C_7$-$C_{14}$-arylalkyl, wherein two radicals $R^1$ in the ortho position relative to each other are bound to an aromatic or heterocyclic ring containing up to 10 ring atoms, wherein up to 3 ring carbon atoms are replaced by hetero atoms and one radical —$R^1$ is always different from hydrogen, is reacted at 140° to 280° C. with (b) alkali metal sulphide, the molar ratio of a:b lying in the range of from 1:1 to 1:2, (c) organic solvent, the molar ratio of alkali sulphide (b) to the organic solvent (c) lying in the range of from 1:2 to 1:20, and (d) water in the form of hydration or free water, the molar ratio of b:d lying in the range of from 1:0 to 1:9, and further wherein the reaction is carried out in the presence of (i) a dihalogenated aromatic disulphide corresponding to formula (III)

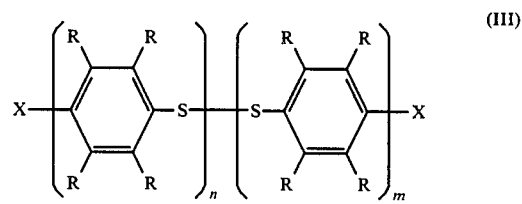

in which

X represents halogen,

R represents hydogen, a $C_1$-$C_4$-alkyl radical, a $C_5$-$C_{10}$-cycloalkyl radical, a $C_7$-$C_{14}$-aryl radical and the total number of carbon atoms in each aromatic substance is from 6 to 30, with the proviso that —R is hydrogen in at least 50 mol % of the disulphide used, n and m are integers of from 1 to 5, and with the further proviso that the molar ratio of the disulphide to the p-dihalogen benzene corresponding to formulae (I) and (II) is in the range of 0.01:1 to 1.0:1 and (ii) a compound which is monofunctional under the reaction conditions which comprises a compound corresponding to the formula (IV)

$$D-Q-Y_t \qquad (IV)$$

wherein

D represents chlorine, bromine or a vinyl group

Y represents hydrogen, —O—CH=$CH_2$, —S—CH=$CH_2$, —OH, —$OR^2$, —$SR^2$, —$NR^2$, —$NO_2$, —CN, —$COOR^2$, or CHO, Q represents an alkylene radical or a cycloalkylene radical containing from 1 to 10 carbon atoms, an arylene radical containing from 6 to 10 carbon atoms, or an arylene radical corresponding to formula (V)

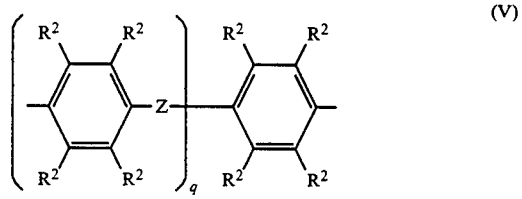

t is 1 or 2 when Q is arylene containing 6 to 10 carbon atoms and is otherwise 1, Z represents $CH_2$, $C(CH_3)_2$, sulphur or oxygen $R^2$ represents hydrogen, an alkyl radical, a cycloalkyl radical, an aryl radical or a mixture thereof, and q represents the number 0 or 1.

* * * * *